United States Patent [19]

Ooguro

[11] Patent Number: 4,682,811
[45] Date of Patent: Jul. 28, 1987

[54] VAN BODY USED WITH CONTAINER CAR, FREIGHT CAR AND TRUCK

[75] Inventor: Yukito Ooguro, Fukuyama, Japan

[73] Assignee: Sanyo Mikawa Body Corp., Japan

[21] Appl. No.: 795,143

[22] Filed: Nov. 5, 1985

[30] Foreign Application Priority Data

Nov. 5, 1984 [JP] Japan .................................. 59-233886
Feb. 19, 1985 [JP] Japan .................................. 60-31714

[51] Int. Cl.⁴ .............................................. B60J 7/16
[52] U.S. Cl. .................................... 296/181; 296/183; 105/378
[58] Field of Search ....................... 296/181, 183, 100; 105/378, 355

[56] References Cited

U.S. PATENT DOCUMENTS

| | | | |
|---|---|---|---|
| 2,979,361 | 4/1961 | Eppinger et al. | 296/100 |
| 3,008,759 | 11/1961 | Stiefel et al. | 296/100 |
| 3,009,426 | 11/1961 | Nampa | 296/100 |
| 3,628,828 | 12/1971 | Page et al. | 296/100 |
| 4,302,044 | 11/1981 | Sims | 296/100 |
| 4,489,975 | 12/1984 | Fredin | 296/181 |
| 4,526,417 | 7/1985 | Dinkel et al. | 296/183 |
| 4,556,248 | 12/1985 | Kobayashi | 296/181 |

*Primary Examiner*—Robert R. Song
*Attorney, Agent, or Firm*—William A. Drucker

[57] ABSTRACT

This invention relates to an improved van body which is used with a container car, a freight car, and a truck and comprises inverse L-shaped side frames located at the right and left side walls of the front and the back of the floor, said side frames being so constructed that the top right and left ends thereof can contact each other at the top center when closed and separate when opened. Shields, each bridging the inverse L-shaped side frames on the same side, provide the vane opening and closing operations at both top ends.

3 Claims, 7 Drawing Figures

VAN BODY USED WITH CONTAINER CAR, FREIGHT CAR AND TRUCK

BACKGROUND OF THE INVENTION

The deck bodies of containers, freight cars, and trucks of the prior arts are opened and closed only at the sides. Hitherto, no idea has been proposed in which a van body has the roof opened and closed. Therefore, it has been impossible to load heavy goods onto or unload them from the deck bodies e.g. by suspending them with cranes.

OBJECT OF THE INVENTION

The object of the present invention is to permit the roof of said van body to open enough to load and unload freight from the top thereof as well as through the sides thereof, making great contributions to the efficiency of cargo operations.

DESCRIPTION OF THE PREFERRED EMBODIMENT

Figure 2:
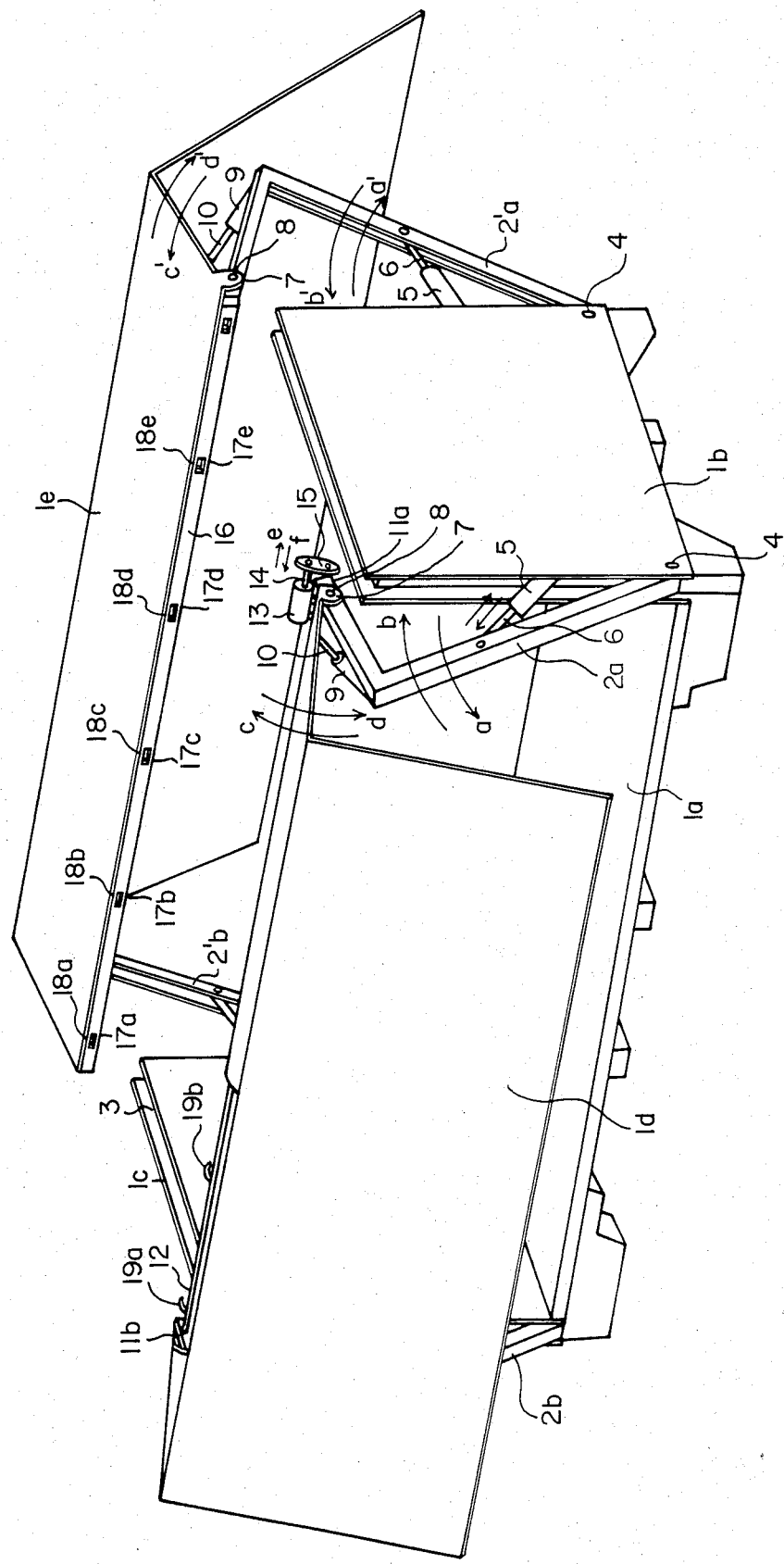
FIG. 2 is an explanatory drawing of the van body in the open state.

In FIG. 2, 1a indicates a rectangular floor on which goods are to rest, 1b and 1c are side wall boards set up on the right and left ends of said floor, and on both sides thereof are shields 1d and 1e, said side wall boards 1b and 1c having vertical and ceiling edges provided with □-shaped (square) grooves 3 except on the bottom, wherein two pairs of inverse L-shaped side frames 2a and 2'a, and 2b and 2'b mounted opposite to each other, come together when closed and are separated right and left from the ceiling center of the side wall boards when opened. The lower ends of said inverse L-shaped side frames 2a and 2'a, and 2b and 2'b are pivoted by pins 4 at the lower points of said side wall boards 1b and 1c, and said side frames 2a, 2'a, 2b and 2'b are operatively connected in the middle of the vertical portins thereof to piston rods 6 of hydraulic cylinders 5 in said grooves 3 in such a way that the operation of the hydraulic cylinders 5 will cause said piston rods 6 to project and retreat, thereby providing the opening and closing operations of said side frames toward arrows a (a') and b (b').

Each of said shields 1d and 1e consists of a board with an inverse L-shaped section capable of shielding the front or the back of said side wall boards 1b and 1c together with one half of the ceiling of the van body, and is pivotally mounted by a pin 8 to a bracket 7 projecting downward at the upper ends of the inverse L-shaped side frames 2a and 2'a, and 2b and 2'b to permit the oscillation of said shields. Operatively mounted on the back of said shields 1d and 1e are the piston rods 10 of the hydraulic cylinders 9 connected to the roof side of the inverse L-shaped side frames 2a and 2'a, and 2b and 2'b, so that the operation of the hydraulic cylinders 9 will cause said piston rods 10 to project and retreat, which, in turn, will effect the vane opening and closing operations of the shields toward arrows c (c') and d (d').

Figure 3A:
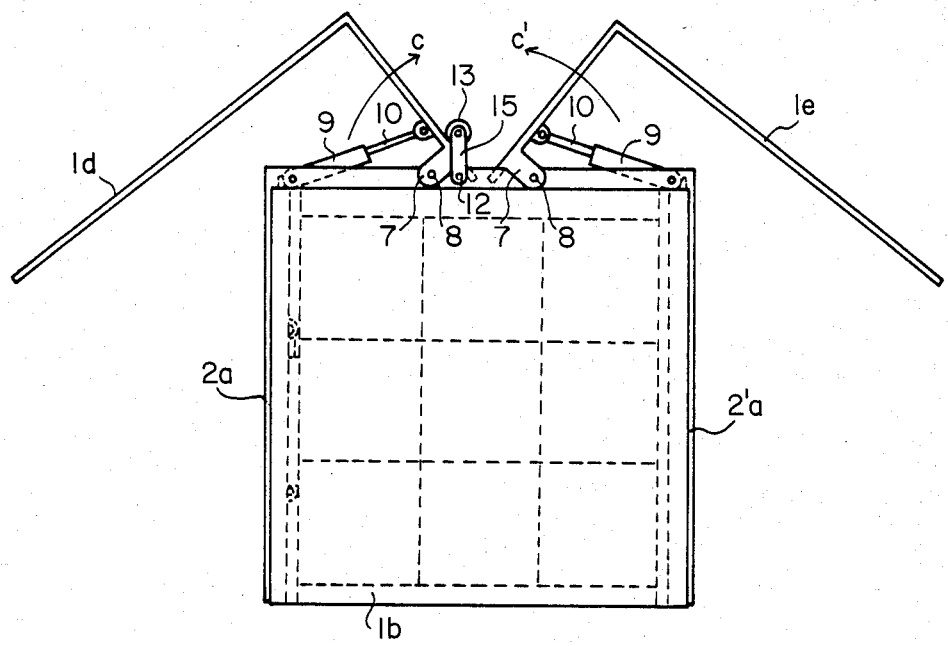
FIGS. 3 A and B show the van body in operating conditions.

Meanwhile, the inverse L-shaped side frames 2a and 2'a, and 2b and 2'b have through holes 11a 11b drilled at the top ends, a bridge rod 12 being inserted in said through holes 11a and 11b and a hydraulic cylinder 13 being installed on top of the inverse L-shaped side frame 2a corresponding to said through hole 11a in such a way that the piston rod 14 of said hydraulic cylinder 13 is connected to the end of said bridge rod 12 (FIG. 3A) via an arm 15 so as to provide the reciprocating movement toward arrows e and f by way of the operations of said hydraulic cylinder 13.

In FIG. 2, 16 indicates a beam connecting the upper ends of the inverse L-shaped side frames 2'a and 2'b, which has recesses 17a, 17b, 17c . . . drilled evenly spaced and provided with pins 18a, 18b, 18c . . .

Figure 1:
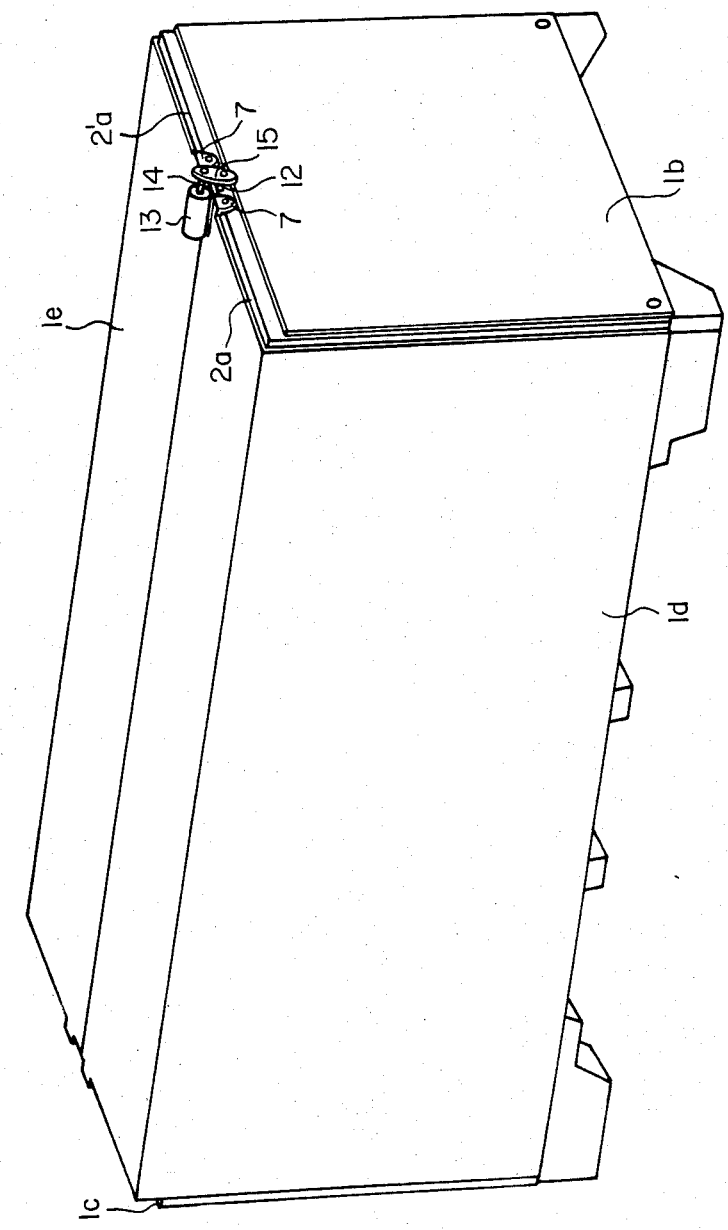
FIG. 1 is an explanatory drawing of a preferred embodiment in the closed state disclosed by the present invention.

Hooks 19a, 19b, 19c . . . are mounted on said bridge rod 12 opposite to and spaced corresponding to the recesses 17 of said beam 16, said hooks 19a, 19b, 19c . . . being inserted into the recesses 17b, 17b, 17c . . . respectively when the inverse L-shaped side frames 2a and 2b are in contact with the side frames 2'a and 2'b respectively, so that the operation of the hydraulic cylinder 13 can move the bridge rod 12 toward the arrow e to engage the hooks 19a, 19b, 19c . . . with the pins 18a, 18b, 18c . . . of the recesses 17a, 17b, 17c . . . respectively, thereby closing and securing the shields 1d and 1e as illustrated in FIG. 1.

The shields 1d and 1e are closed as described above at the time of the completion of loading freight onto the floor 1a for transit. When unloading the freight at destinations after transit, the reverse operation of said hydraulic cylinder 13 will shift the bridge rod 12 in the f direction to disengage said hooks 19a, 19b, 19c from the pins 18a, 18b, 18c . . . of the recesses 17a, 17b, 17c . . . In this case, the joint between the shields 1d and 1e is applied with sealing rubber packings not illustrated here.

Figure 3B:
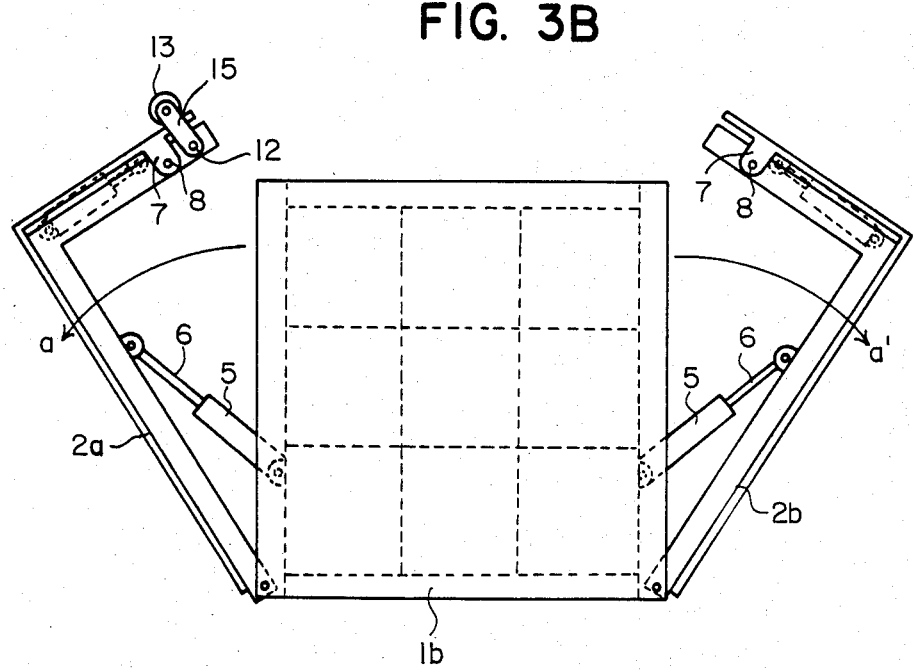

In addition to the above functions of the present invention, freight can also be loaded and unloaded from the sides as shown in FIG. 3 A by operating the hydraulic cylinders 9 mounted on the upside of the inverse L-shaped side frames 2a and 2b, and 2'a and 2'b to rotate the shields 1d and 1e toward arrows c and c' as illustrated, thereby opening the sides of the van deck.

The hydraulic cylinders described above are driven by way of batteries not shown here, or alternatively by connecting the cylinders to a power unit on a truck. The present invention can be used as a single, independent body such as a container, and also be integrated into deck bodies of freight cars as shown in FIG. 4, wherein the backboard behind a driver's cab 20 can be substituted for the side wall board 1b.

Figure 4:
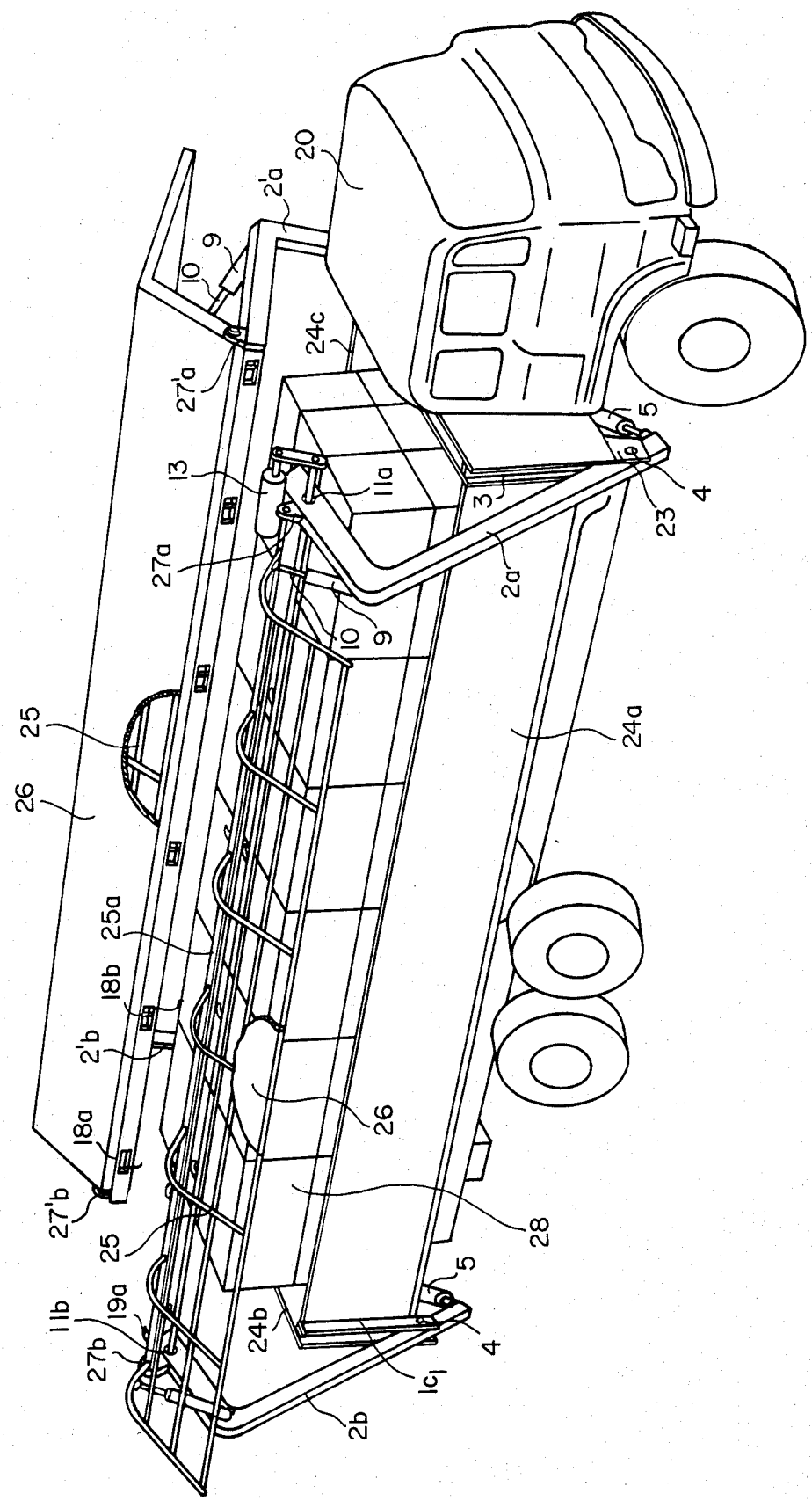
FIG. 4 is an explanatory drawing, with portions broken away for clarity, of a preferred embodiment of this invention set on a cargo conveying truck.
Figure 5A:
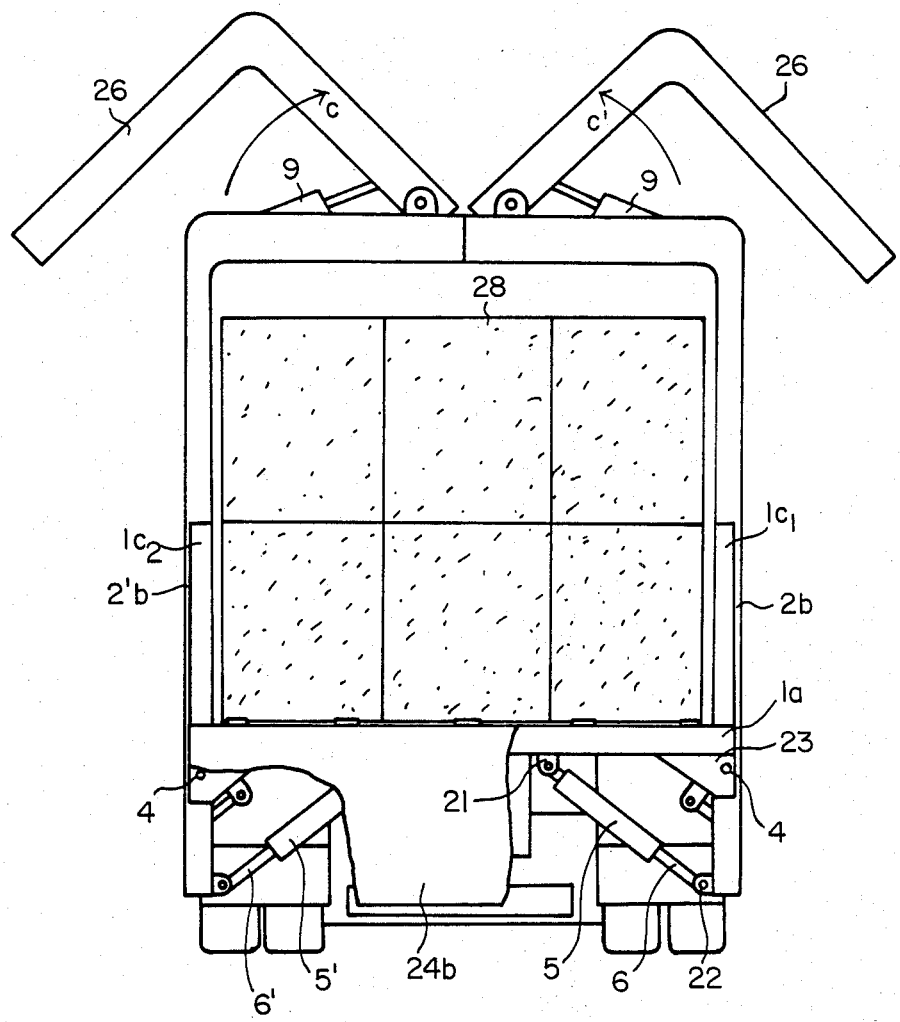
FIGS. 5 A and B show the preferred embodiment of FIG. 4 in operating conditions.
Figure 5B:
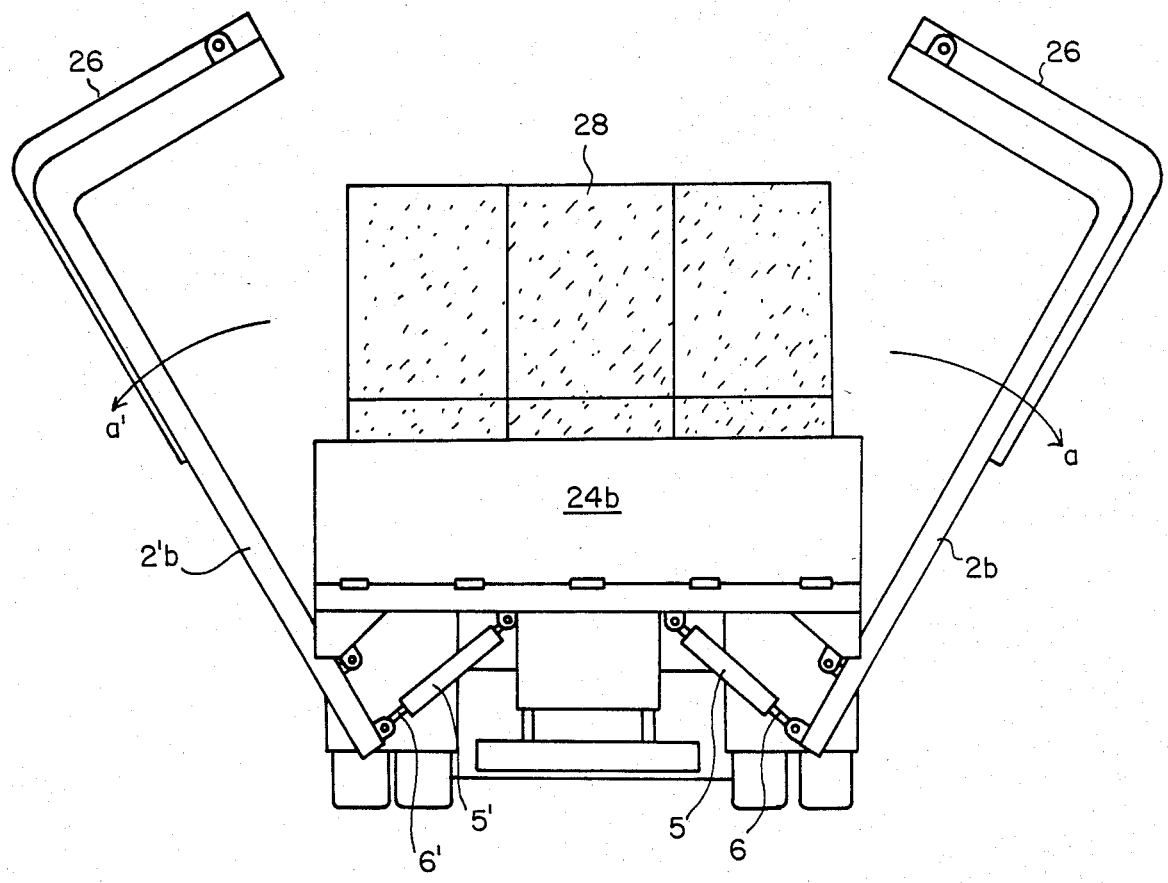

The hydraulic cylinders 5, which are mounted in the ⊔-shaped grooves 3 in the preceding embodiment, can also be attached downward from the center of the back of the floor 1a via the bracket 21 as in FIG. 4, the piston rods 10 being pivotally mounted by pins 22 to the lower ends of the inverse L-shaped side frames 2a and 2b, and 2'a and 2'b, and the pins 4 acting as an oscillating fulcrum of said side frames being mounted onto brackets 23 projecting downward at both the ends of the floor 1a. 24a, 24b and 24c indicate gate boards so mounted as to easily rise and fall at three parts surrounding the deck body 1a. Because of the gate board 24b, the side wall board 1c in the preceding embodiment has been left only in the form of struts $1c_1$ and $1c_2$ at the back ends of the deck body 1a. The shields 1d and 1e in this embodiment consist of awning pipes 25 covered with waterproof sheets 26, and the main rod 25a at the upper end of said awning pipes 25 being supported by bearings 27a, 27b, and 27'a and 27'b equipped at the upper ends of the inverse L-shaped side frames 2a, 2b, 2'a, and 2'b. This embodiment shows the awning pipes covered with waterproof sheets 26, which can be replaced with metallic plated or reinforced plastic plates. In this case, the shields have enough height to reach the gate boards. Except for these points, this preferred embodiment of this invention is similar in construction to the preceding one. Freight 28 can be loaded and unloaded from the sides by actuating the hydraulic cylinder 9 mounted on the top side of the inverse L-shaped side frames 2a and 2b, and 2'a and 2'b as illustrated in FIG. 5 A to rotate the shields 1d and 1e toward the arrows c and c', thereby opening the gate boards 24a and 24c upward and bringing the gate boards 24a and 24b downward in order to expose the deck body 1a. This procedure is conveniently used for loading and unloading freight 28 from the sides, e.g., by means of a fork lift.

Meanwhile, when loading and unloading freight suspended by cranes and chain hoists from the top, as shown in FIG. 5 B, the hydraulic cylinder 5 is operated to rotate the inverse L-shaped side frames 2a and 2b, and 2'a and 2'b toward the arrows a and a', thereby completely opening the roof to permit easy loading and unloading of freight from the top of the deck body.

The above description shows a preferred embodiment of the present invention used in a freight conveying truck. The invention can also be embodied in a similar construction in the form of freight cars which run with iron wheels on rails, which is to be within the claims of the present invention.

As described hitherto, the present invention can provide easy loading and unloading of goods from the top, e.g., by cranes as well as carrying freight in and out from the sides, consequently permitting easy rapid conveying operations of a wide range of light and heavy weights, and hence making great contributions to improvements in the efficiency of cargo operations.

We claim:

1. A van body comprising opposing inverse L-shaped side frames located at the front and rear of a floor, the upper ends of the opposing inverse L-shaped frames contacting each other in the top center and separated from each other when closing and opening, the lower ends thereof being pivotally connected to the front and back of said floor and shields bridging the inverse L-shaped frames on the same side, said shields being pivotally connected to the upper ends of the inverse L-shaped frames and means for closing and opening the inverse L-shaped frames and shields to effect the vane opening and closing operations at the upper edges.

2. A cargo converying truck equipped with the van body claimed in claim 1.

3. A freight car equipped with the van body claimed in claim 1.

* * * * *